United States Patent [19]

Zimmerman

[11] Patent Number: 4,601,629

[45] Date of Patent: Jul. 22, 1986

[54] FINE AND COARSE AGGREGATES CONVEYING APPARATUS

[76] Inventor: Harold M. Zimmerman, R.D. 1, Wabash Rd., Ephrata, Pa. 17522

[21] Appl. No.: 622,380

[22] Filed: Jun. 20, 1984

[51] Int. Cl.[4] .......... B65G 65/42

[52] U.S. Cl. .......... 414/327; 198/735; 414/528

[58] Field of Search .......... 414/266, 267, 268, 304, 414/327, 502, 528; 198/735

[56] References Cited

U.S. PATENT DOCUMENTS

| | | | |
|---|---|---|---|
| 1,557,839 | 10/1925 | Hodgson . | |
| 2,372,798 | 4/1945 | Sinden . | |
| 2,487,887 | 11/1949 | McEachran . | |
| 2,493,451 | 1/1950 | Gaddis et al. | 414/528 |
| 2,571,444 | 10/1951 | Hapman | 198/716 X |
| 2,926,961 | 3/1960 | Diebold | 414/327 X |
| 3,047,129 | 7/1962 | Wiener | 198/735 X |
| 3,310,293 | 3/1967 | Zimmerman | 366/6 |
| 3,339,898 | 9/1967 | Futty et al. . | |
| 3,432,151 | 3/1969 | O'Loughlin . | |
| 3,498,486 | 3/1970 | Freeman, Jr. | 414/528 X |
| 3,526,392 | 9/1970 | Buelow . | |
| 3,888,467 | 6/1975 | Sheets . | |
| 4,051,948 | 10/1977 | Sackett, Sr. | 198/735 X |
| 4,298,288 | 11/1981 | Weisbrod . | |

FOREIGN PATENT DOCUMENTS

| | | | |
|---|---|---|---|
| 200259 | 7/1955 | Australia | 414/528 |

*Primary Examiner*—Robert J. Spar
*Assistant Examiner*—Stuart J. Millman
*Attorney, Agent, or Firm*—Michael R. Swartz; John R. Flanagan

[57] ABSTRACT

In a concrete production system, an improved aggregates conveying apparatus includes an aggregates drag conveyor having a lower, conveying run which drags aggregates along a centrally-located, common trough shared by separate fine and coarse aggregates hoppers to a discharge end and an upper, return run which moves through a hollow channel formed in a common wall separating the hoppers above the common trough.

5 Claims, 14 Drawing Figures

Fig. 3
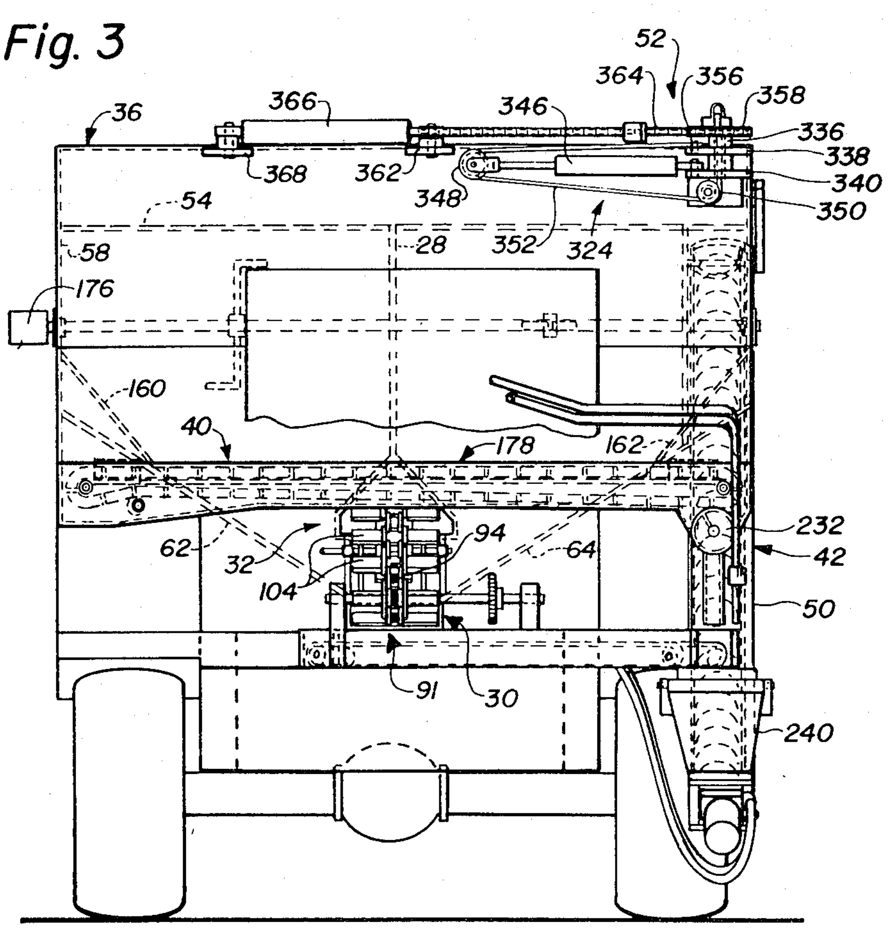
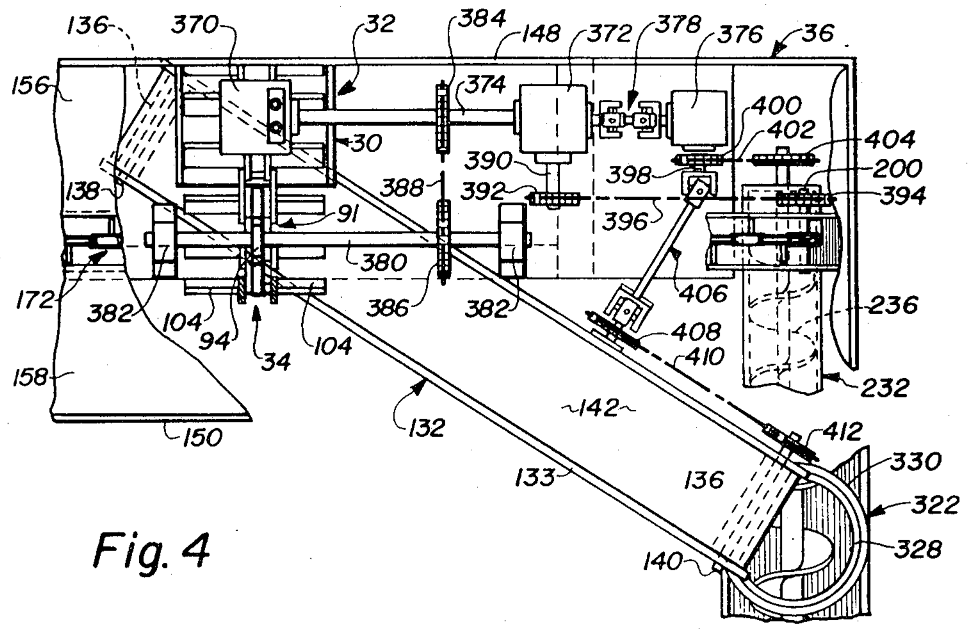
Fig. 4

Fig. 12
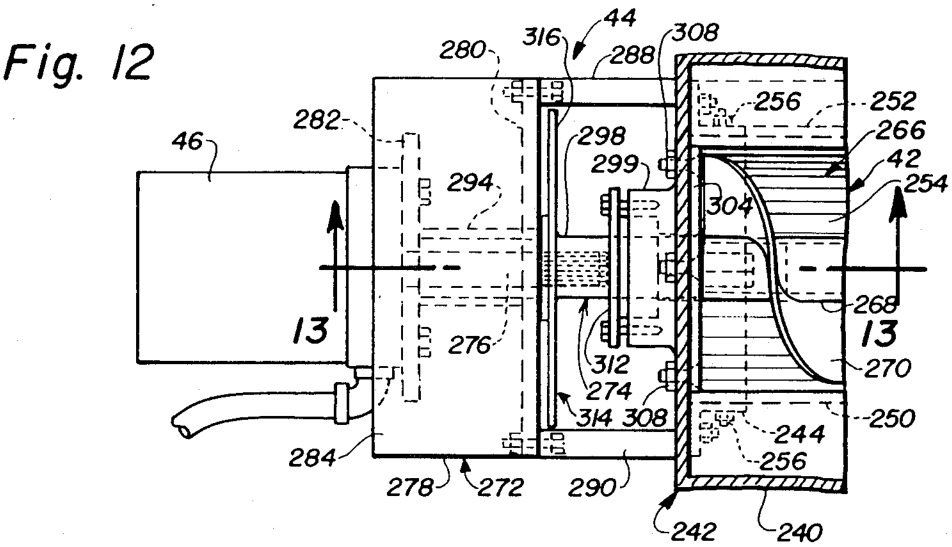
Fig. 13
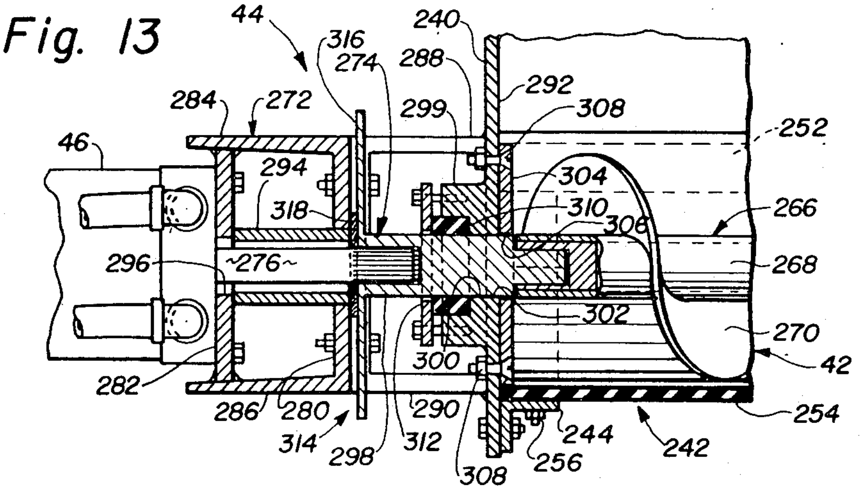
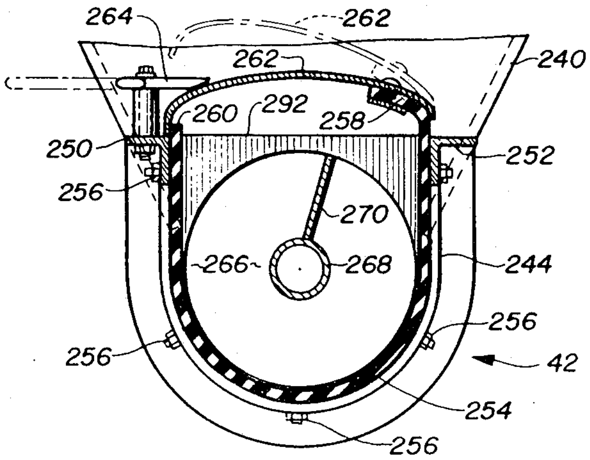
Fig. 14

FINE AND COARSE AGGREGATES CONVEYING APPARATUS

CROSS REFERENCES TO RELATED APPLICATIONS

Reference is hereby made to the following co-pending U.S. patent applications dealing with subject matter related to the present invention:

1. "Improved Cement Metering Apparatus" by Harold M. Zimmerman, U.S. Ser. No. 622,377, filed June 20, 1984.
2. "Improved Motor Mounting Arrangement on a Mixing Auger" by Harold M. Zimmerman, U.S. Ser. No. 622,376, filed June 20, 1984, now U.S. Pat. No. 4,538,916.
3. "Improved Mixing Auger Mounting and Storage Arrangement" by Harold M. Zimmerman, U.S. Ser. No. 622,606, filed June 20, 1984, now 4,579,459.

BACKGROUND OF THE INVENTION

1. Field of the Invention

The present invention relates generally to the art of site production of concrete and, more particularly, is concerned with a system incorporating improved features for facilitating more efficient, problem-free and versatile production of concrete.

2. Description of the Prior Art

It is accepted practice today to produce concrete at the job site where it is to be used, and as it is used, by employment of a complete concrete production plant mounted on a truck or other suitable chassis. One type of mobile concrete production plant which has achieved widespread commercial acceptance is the ZIM-MIXER system, which was originally illustrated and described in U.S. Pat. No. 3,310,293 to Harold M. Zimmerman.

The ZIM-MIXER mobile concrete production system includes a storage tank mounted on the chassis bed which has two longitudinally extending hoppers separated by a common wall. One hopper contains sand, and the other contains gravel or stone. A central, longitudinal conveyor operatively mounted along a bottom trough common to both hoppers receives sand and stone and delivers the materials to a rear discharge end. Also, the system includes a separate cement hopper as well as a separate water tank mounted on the chassis. Cement is dispensed in the desired proportion by a metering mechanism from the cement storage hopper into the discharging sand and stone and all three ingredients are then delivered into a elongated mixing trough mounted on the rear of the chassis. Water is added with the materials at the entrance and the ingredients are mixed into concrete in the trough before being discharged from the trough at the job site.

Many advantages and benefits are enjoyed by persons who employ the ZIM-MIXER system in their concrete production business. An important one is that the system permits the formulation and delivery of relatively small batches of concrete which can be used to fulfill orders where only small quantities of concrete are needed, thus obviating the need for taking such quantities from a single large pre-mixed batch. Since only a small portion of the system, the mixing trough, is utilized for mixing the concrete, it can be quickly and easily cleaned after completion of a "mixing" or production operation. Equally important, since the mixing of the concrete is performed "on site", selective variation of the ingredients of the mixture can be readily accomplished and the water content of the mixed concrete can be easily controlled. Finally, in the mixing trough, a positive mechanical mixing action at a desired rate is performed to assure a uniform dispersal of all the ingredients of the concrete mix.

For the most part, the overall performance of the ZIM-MIXER mobile concrete production system has met and even surpassed expectations over the years. However, from time to time, in any system, and the ZIM-MIXER system is no exception, a need arises to make certain improvements which will solve problems which crop up and to increase performance and productivity even further.

SUMMARY OF THE INVENTION

The preferred embodiment of a mobile concrete production system, as disclosed herein, includes several improved features which meet the aforementioned needs. While the improved features are particularly adapted for working together to facilitate the production of concrete in an improved manner, it is readily apparent that such features may be incorporated either singly or together in concrete production systems.

Some of the several improved features comprise inventions claimed in other co-pending applications, cross-referenced above; however, all of the improved features are illustrated and described herein for facilitating a complete and thorough understanding of those of the features comprising the present invention.

The present invention relates to those features incorporated into the mobile concrete production system for facilitating improved delivery of fine and coarse aggregates, such as sand and stone, from their respective storage locations to a discharge area closer to where they will be combined with cement and water for mixing into concrete. One problem area in the prior concrete production system disclosed in the aforementioned patent resides in the arrangement of the conveyor along the common bottom trough of the sand and stone hoppers. Both the upper conveying and lower return runs of the belt employed by the conveyor are disposed in the lower, common trough of the hoppers. As a result, periodically, materials would lodge around the edge of the conveyor belt. The present invention provides a conveyor which utilizes a drag chain wherein its lower conveying run drags or scrapes across the trough and its upper return run passes through a longitudinal cavity formed between the two hoppers. Such arrangement substantially eliminates the problem of material build-up around the edges as occurred in the case of the belt conveyor and also the requirement of special edge shields.

Accordingly, the present invention is directed to an improved aggregates conveying apparatus in a concrete production system. The system has a longitudinal tank for storing aggregates and a longitudinal bottom trough for receiving the aggregates from the tank. The improved aggregates conveying apparatus includes a continuous conveyor mounted for movement along the trough and having a lower aggregate conveying run and an upper return run. The lower run is disposed in slidable engagement with the trough for dragging aggregates, received in the trough from the tank, toward a discharge end of the trough. The upper run is disposed above the trough and lower run of the conveyor. The apparatus also includes a longitudinal wall structure extending through the tank and defining a cavity or chamber isolated from the aggregates stored in the tank. The chamber provides a passageway for the upper return run of the conveyor.

More particularly, the conveyor includes a continuous link-type drive chain with drag bars attached to, and extending laterally from, opposite sides of the chain and adapted to scrape along the bottom of the trough. The drag bars are slanted upwardly in a direction opposite to their direction of movement so that movement of the bars under aggregates in the trough forces the chain toward the trough bottom, preventing the chain from riding over the aggregates. Further, the longitudinal wall structure includes a tubular wall portion spaced above the trough which defines the chamber providing the passageway for the upper return run of the conveyor.

In the preferred embodiment, the tank includes a pair of side-by-side, longitudinal hoppers for storing fine and coarse aggregates, respectively, and said bottom trough is common to both of the hoppers for receiving the aggregates therefrom. Further, the longitudinal wall structure includes a lower longitudinal, generally vertical wall portion attached below the tubular wall portion and disposed above and generally aligned with the conveyor drive chain such that the chain and vertical wall portion substantially segregate the fine and coarse aggregates from one another as they are being conveyed toward the discharge end of the trough.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 3 is a rear elevational view of the mobile concrete production system of FIG. 1.

FIG. 4 is an enlarged fragmentary top plan view of the rear portion of the system shown in FIG. 2, but with most of a cement hopper broken away to expose a power drive train of the system.

FIG. 12 is an enlarged fragmentary top plan view, partly in section, of the improved motor mounting arrangement on the auger, as seen along line 12—12 of FIG. 1.

FIG. 13 is a fragmentary sectional view taken along line 13—13 of FIG. 12.

FIG. 14 is a fragmentary sectional view taken along line 14—14 of FIG. 1, showing the cover and latch for the mixing auger.

DETAILED DESCRIPTION OF THE PREFERRED EMBODIMENT

In the following description, right hand and left hand references are determined by standing at the rear of the mobile chassis and facing in the direction of forward travel. Also, in the following description, it is to be understood that such terms as "forward", "left", "upwardly", etc., are words of convenience and are not to be construed as limiting terms.

IN GENERAL

Figure 1:
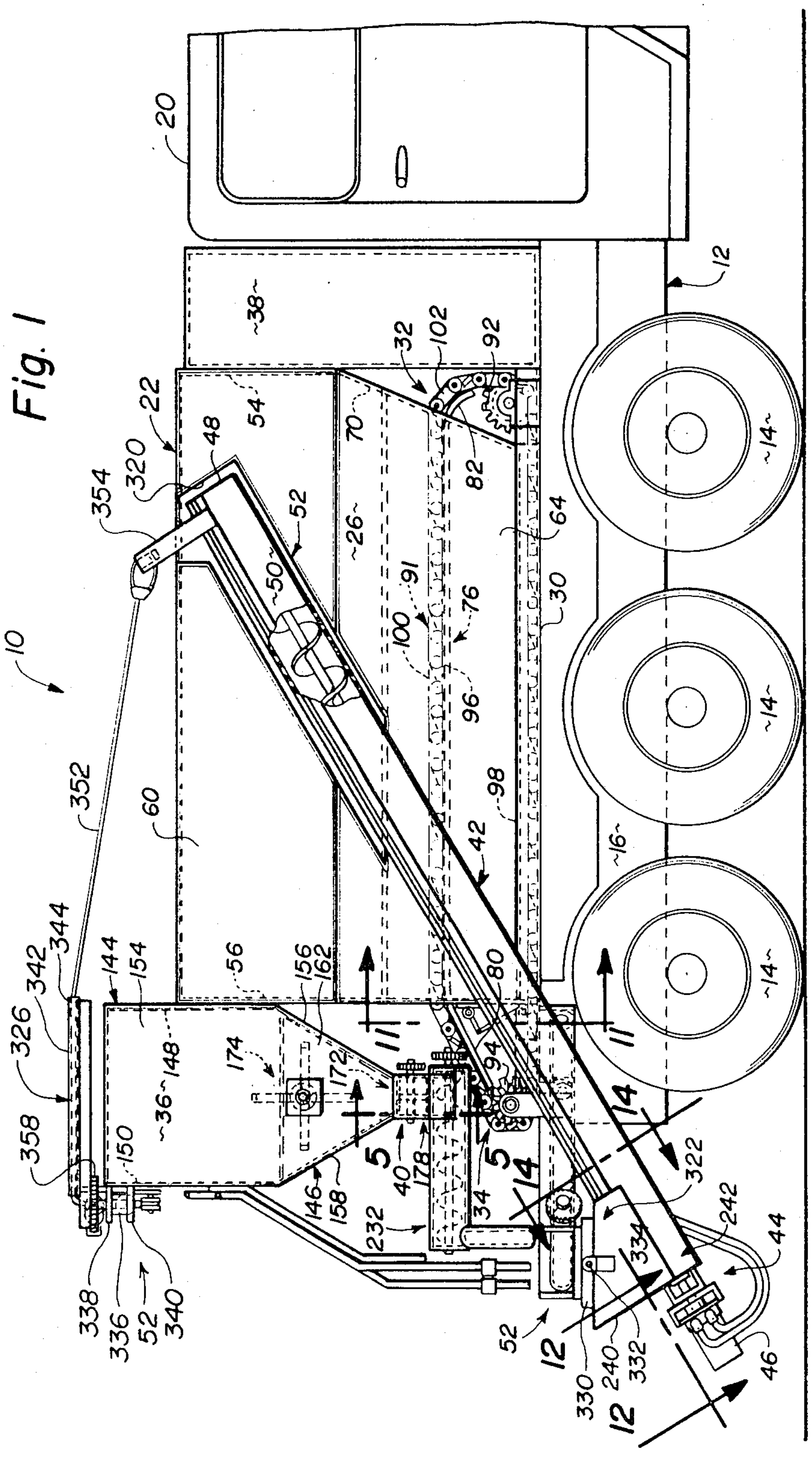
FIG. 1 is a fragmentary side elevational view of a mobile chassis mounting an improved concrete production system which embodies the principles of the present invention.
Figure 2:
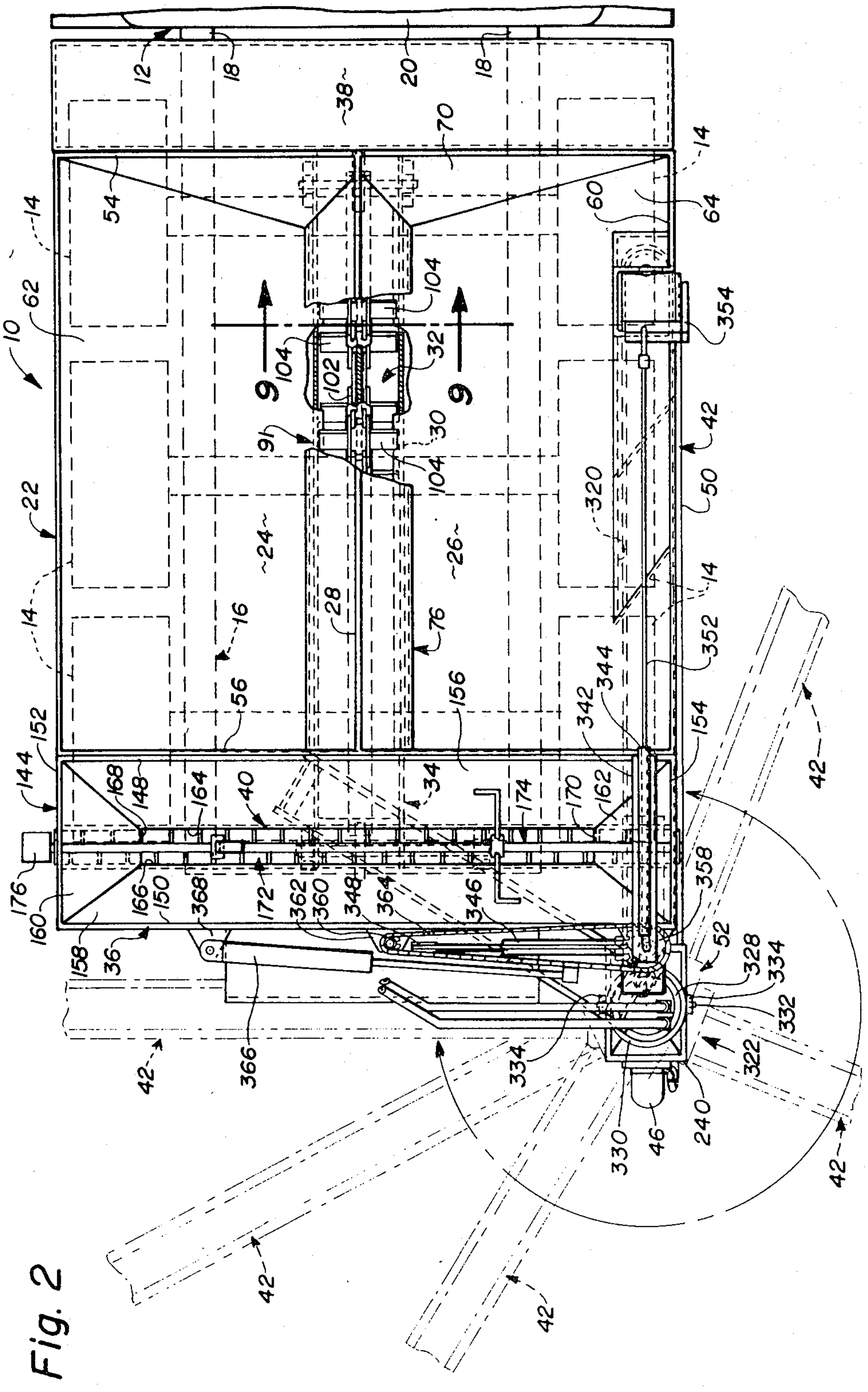
FIG. 2 is a top fragmentary plan view of the mobile concrete production system of FIG. 1, showing the improved mixing auger mounting and storage arrangement.

Referring now to the drawings, and more particularly to FIGS. 1 and 2, there is shown a mobile concrete production system being indicated generally by the numeral 10, incorporating the preferred embodiments of the improved features comprising the present invention and the other inventions claimed in the above cross-referenced applications. The left side of the system 10 is shown in FIG. 1 when one is standing to the rear of the system and facing in the direction of forward travel.

The concrete production system 10 is provided with a chassis, indicated generally at 12, made mobile by three tandemly-arranged pairs of rear wheels 14 and a pair of front wheels (not shown). The chassis 12 has a bed 16 formed by longitudinally extending channels 18, suitably interconnected by spaced transverse channels (not shown), and a cab 20 mounted at the forward end of the bed. A source of power, such as an engine (not shown) is suitably mounted on the chassis 12 at the front of the cab 20 for driving, preferably, the rear pairs of wheels 14. Although the system 10 illustrated is a self-propelled type, it could just as readily take the form of pull-type system with the forward ends of the channels 18, instead of mounting the cab 20, converging in an assemby which would adapt the system to be secured to some towing vehicle, located at its front end.

The concrete production system 10 includes a storage tank 22 mounted on the chassis bed 16 which has two longitudinally-extending hoppers 24, 26 separated by a common wall 28 and having a common bottom trough 30. One hopper 24 contains fine aggregates, such as sand, and the other hopper 26 contains coarse aggregates, such as gravel or stone. Mounted along the common bottom trough 30 of the hoppers is the first improved feature employed by the concrete production system 10, such feature being the improved aggregates conveying apparatus, generally designated 32. The apparatus 32 receives sand and stone and delivers the materials to a rear discharge end, generally designated 34. Also, the concrete production system 10 includes a separate cement hopper 36 mounted transversely across the rear of the chassis bed 16 as well as a separate water tank 38 mounted on the bed 16 between the forward end of the storage tank 22 and rear side of the cab 20. Cement is dispensed in the desired proportion from the hopper 36 by an improved metering apparatus 40 which constitutes the second improved feature employed by the production system 10. The dispensed cement is delivered into the sand and stone as the same discharges into an elongated mixing auger 42. The auger 42 has an improved mounting arrangement 44 for a motor 46 powering the auger, which arrangement constitutes the third improved feature incorporated by the concrete production system 10. The auger 42 mixes the ingredients into concrete after water is added thereto. Therefore, the concrete is mixed by the auger 42 at the job site just prior to being discharged from a terminal end 48 of a trough 50 of the auger 42. The auger 42 is mounted at a rear corner of the chassis bed 16 by an improved mounting and storage arrangement 52 which constitutes the fourth improved feature incorporated by the system 10. The improved arrangement 52 allows storage of the auger out of the way and a greater range and ease of movement thereof through an infinite variety of operating positions.

IMPROVED FINE AND COARSE AGGREGATES CONVEYING APPARATUS

As mentioned above, the first improved feature incorporated by the concrete production system 10 is the improved aggregates conveying apparatus 32, as depicted in FIGS. 1-4 and 9-11, which is operatively associated with both hoppers 24,26 of the storage tank 22.

Figure 9:
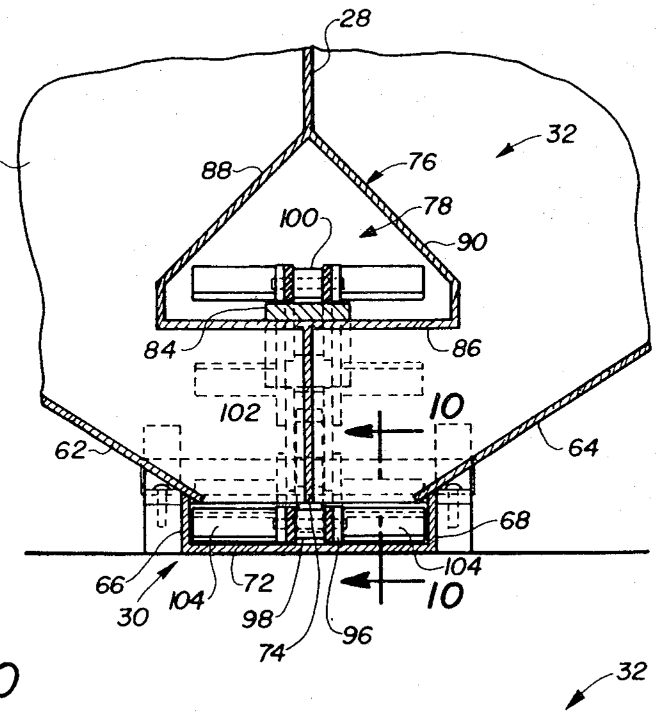
FIG. 9 is an enlarged fragmentary sectional view taken along line 9—9 of FIG. 2, showing the improved fine and coarse aggregates conveying apparatus.

The storage tank 22, which defines the hoppers 24,26, has front and rear, generally vertical, end walls 54,56 and left and right, generally vertical, side walls 58,60 which extend between and interconnect the front and rear end walls. The common vertical wall 28 interconnects the front and rear end walls 54,56 substantially midway between the left and right side walls 58,60. The common wall 28 is disposed above and in general alignment with a longitudinal mid-line of the common trough 30 which extends along the bottom of the tank 22. The tank 22 also has a pair of bottom walls 62,64, each of which interconnects one of the side walls 58,60, both of the end walls 54,56 and one of the upper longitudinal edges of a pair of spaced, upright sides 66,68 of the common trough 30. The bottom walls 62,64 also are oppositely-inclined from one another so as to slope in converging fashion from respective ones of the vertical side walls 58,60 downwardly toward respective upper longitudinal edges of the upright sides 66,68 of the common trough 30. As seen in FIG. 9, the inner terminal edge of each tank bottom wall 62,64 extends somewhat past the upper edges of the trough upright sides 66,68. In FIG. 1, it will be noted that a lower portion 70 of the front end wall 54 is inclined rearwardly, the purpose for which will be explained shortly. As mentioned earlier, the common wall 28 divides the tank 22 into two longitudinally-extending left and right hoppers 24,26 which share the common trough 30 more or less equally. The respective inclined bottom walls 62,64 ensure that fine aggregates, such as sand, contained in left hopper 24 and coarse aggregates, such as stone, contained in right hopper 26 will flow under the influence of gravity toward the common bottom trough 30.

Figure 10:
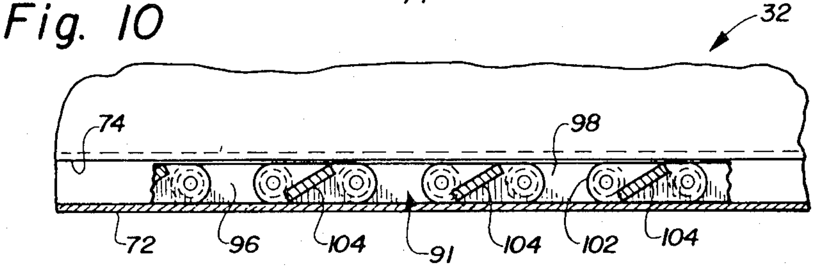
FIG. 10 is a fragmentary sectional view taken along line 10—10 of FIG. 9, showing the slanted orientation of the bars on the drag conveyor of the fine and coarse aggregates conveying apparatus.
Figure 11:
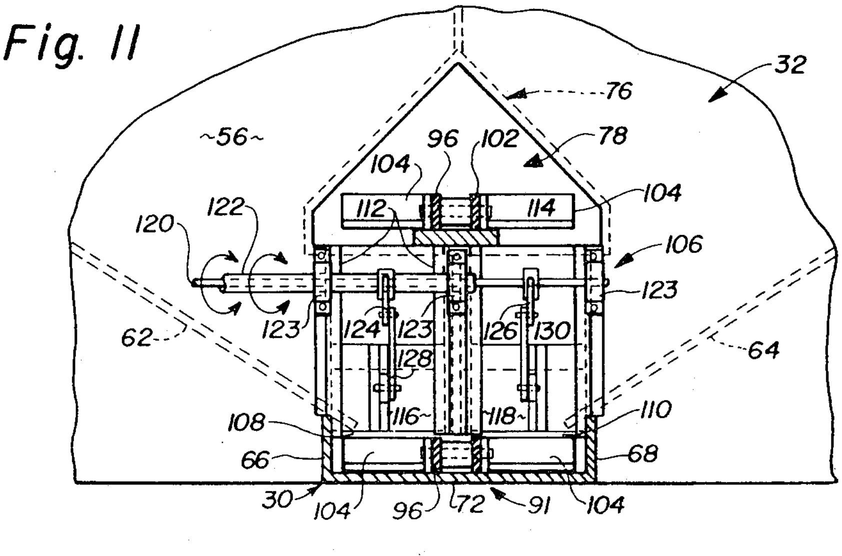
FIG. 11 is an enlarged fragmentary rear elevational view, partly in section, of the metering gate mechanism at the rear end of the fine and coarse aggregates hoppers, as seen along line 11—11 of FIG. 1.

As clearly seen in FIGS. 9-11, the elongated common trough 30 has the spaced pair of generally upright sides 66,68 and a generally horizontal bottom floor 72 which interconnects the sides at their respective lower longitudinal edges. The trough 30 is thereby open at its top and in communication with each of the hoppers 24,26. Since the bottom floor 72 of the trough 30 is spaced below the lower longitudinal edge 74 of the common wall 28 (which edge 74 is more or less aligned horizontally with the upper edge of sides 66,68), the trough 30 provides a region or space, rectangular in cross-section, between its opposite upright sides 66,68. Aggregates may flow into the space and pile up on the bottom floor 72. Also, components of the aggregates conveying apparatus 32 will operate through the space of the trough 30 as will be described shortly. The trough 30 extends beyond the front inclined end wall portion 70 and also beyond the rear end wall 56.

As depicted in FIGS. 2, 3, 9 and 11, the aggregates conveying apparatus 32 includes a longitudinal wall structure in the form of a elongated hollow channel 76 having a triangular shape in cross-section and extending along the common wall 28 between the hoppers 24,26 and between the front and rear end walls 54,56. The channel 76 is sufficiently spaced above the plane of the upper edges of the trough sides 66,68 so as not to obstruct the free flow of aggregates from their respective hoppers 24,26 into the common trough 30. The channel 76 defines a longitudinally-extending cavity or chamber 78 between the hoppers which is isolated from the aggregates stored in the hoppers and provides a passageway open at its opposite ends, for a conveyor of the aggregates conveying apparatus 32 to operate through, as will be explained shortly. An inclined rear ramp 80 and curved front ramp 82 connected to the channel 76 at the respective openings thereto lead into and from the chamber 78. A track pad 84 is disposed on a bottom 86 of the channel 76 and runs along the center thereof between its opposite ends. The top surface of pad 84 has a slight depression with a shallow-V profile in cross-section which tends to maintain any conveyor which might run along the pad 84 in a centered position on the pad. The opposite sides 88,90 of the channel 76 slope in divergent fashion downwardly away from the common wall 28 to their connection with the bottom 86 of the channel so as to present surfaces which encourage gravity flow of aggregates located above the channel 76 outwardly and downwardly toward the trough 30.

The aggregates conveying apparatus 32 further includes an aggregate drag conveyor 91. The conveyor 91 includes front and rear idler and driven sprockets 92,94 rotatably mounted to the chassis 12 adjacent the front and rear ends of the common trough 30 and spaced outwardly from opposite front and rear ends of the hollow channel 76. The sprockets 92,94 are aligned in a vertical, fore-and-aft extending plane which longitudinally bisects the common trough 30 and elongated channel 76.

Also, included in the conveyor 91 is a continuous, link-type drive chain 96 which extends about the sprockets 92,94 for movement along an endless path. A lower, aggregate conveying run 98 of the chain 96 is disposed for movement in a rearward direction along and above the trough floor 72, while an upper, return run 100 of the chain 96 is disposed above the trough 30 and lower run 98 for movement in a forward direction through the hollow channel 76. The height of the chain links 102 is slightly less than that of the trough sides 66,68 and the space between the lower edge 74 of the common wall 28 and the trough floor 72 such that sufficient clearance is provided for the chain 96 to travel along the trough floor 72 in vertical alignment with the common wall 28. However, the chain is disposed close enough to the wall 28 to substantially maintain separation or segregation of fine and coarse aggregates in respective trough portions on either side of the chain 96.

Finally, the aggregate drag conveyor 91 includes a series of drag bars 104 attached to, and extending laterally from, opposite sides of the chain 96 into left and right portions of the trough. The bars 104 are adapted to make slidable engagement with and scrape along, the bottom floor 72 of the trough 30 for dragging aggregates, received in the trough from the hoppers 24,26, toward the rear discharge end 32. The bars 104 are rectangular shaped and have a width and height designed to substantially fill the portions of the trough 30 on either side of the chain 96 so as to not allow any build-up or wedging of aggregate material in corners of the trough. So respective aggregates flowing from hoppers 24,26 into opposite lateral portions of the trough 30 on either side of the chain 96 and lower edge 74 of common wall 28 fill the trough portions between the spaced drag bars 104 on each side of the chain 96 as the lower conveying run 98 of the chain travels rearwardly along the floor 72 of the trough 30. As clearly seen in FIG. 10, the drag bars 104 are disposed in a slanted or angular relationship upwardly, rear to front (or in a direction opposite to their direction of movement) so that movement of the drag bars in a rearward direction forces them under the material and keeps the chain 96 down against the trough floor 72. This prevents the lower run 98 of the chain 96 from riding up over the material which coul obstruct flow of aggregates into the trough and rearward conveying thereof. Also, the lower edge 74 of the common wall 28 would tend to keep the chain from rising up over the material.

As illustrated in FIGS. 1 and 11, a metering gate mechanism, generally designated 106, is disposed in the rear end wall 56 of the tank 22 above the trough 30. The gate mechanism 106 is generally similar to the one disclosed in aforesaid U.S. Pat. No. 3,310,293, being actuable for adjusting the amount by which a pair of side-by-side openings 108,110 formed in the tank rear end wall are opened. This together with regulation of the speed of the aggregate drag conveyor 91 determines the rate at which aggregates are conveyed from the tank 22. The mechanism 106 includes pairs of vertical tracks 112,114 bounding each side of the openings 108,110 with a gate or door 116,118 slidable along each track pair. Inner and outer concentric shafts 120,122 are rotatably mounted by bearings 123 to the regions of the rear tank end wall 56 adjacent the openings 108,110 and outwardly therefrom. Levers 124,126 are provided on the shafts 120,122 and links 128,130 interconnect the respective levers 124,126 with corresponding doors 116,118. Rotation of outer shaft 120 causes raising and lowering of door 116, while rotation of inner shaft 122 causes raising and lowering of door 118. Access may be gained to the shafts 120,122 at the left side of the chassis 12. It is readily apparent that the mechanism 106 is disposed between the upper and lower runs 100,98 of the chain 96 so as not to interfere with operation of the latter.

For transferring aggregates from the rear discharge end 34 of the aggregates conveying apparatus 32 to the mixing auger 42, a transverse belt conveyor is provided, being designated 132 in FIGS. 1–4. The conveyor 132 includes a frame 133 with a pair of rollers 134,136 rotatably mounted on shafts 138,140 disposed across opposite ends of the frame 133. An endless conveyor belt 142 for receiving, transferring and discharging the aggregates is entrained about the opposite rollers 134,136.

IMPROVED CEMENT METERING APPARATUS

Simultaneously as sand and stone are delivered to the mixing auger 42 by the aggregates conveying apparatus 32 and transverse belt conveyor 132, as just described, cement is dispensed in the desired proportion relative to the sand and stone from the cement hopper 36 to the mixing auger 42 by the second improved feature incorporated by the concrete production system 10, that being the improved cement metering apparatus 40 depicted in FIGS. 1–4 and 5–8.

The cement hopper 36 is mounted on the chassis 12 so as to extend transversely across the rear portion thereof. It is formed with a rectangular box-like upper portion 144 which merges with a conical tapered lower portion 146. The upper portion 144 has front and rear end walls 148,150 interconnected by left and right side walls 152,154. The lower portion 146 has front and rear inclined bottom walls 156,158 and left and right inclined bottom walls 160,162. The front and rear bottom walls 156,158 have opposite lower edges 164,166 and the left and right bottom walls 160,162 have opposite lower edges 168,170 which together define a generally rectangular, elongated opening 172 in the bottom of the cement hopper 36 through which cement flows in discharging from the hopper.

The improved cement metering apparatus 40 is mounted along the bottom of the cement hopper 36 in communication with its bottom discharge opening 172 for receiving cement flowing from the hopper 36 under the influence of gravity. A cement beating device 174 is mounted between the left and right side walls 152,154 of the upper tank portion 144 above the discharge opening 172. It can be rotated by operation of a motor 176 mounted on the left side wall 152 so as to prevent bridging of cement between the walls and across the opening of the cement hopper 36.

As best seen in FIGS. 5–8, the cement metering apparatus 40 includes an elongated trough 178 having a rectangular cross-section and being disposed below the cement hopper 36 along its discharge opening 172. The trough 178 has a pair of generally vertical, front and rear side walls 180,182 which are connected at their upper edges with the opposite lower edges 164,166 of the hopper front and rear bottom walls 156,158. The trough 178 also has generally vertical, left and right end walls 184,186 which interconnect the side walls 180,182 at locations spaced laterally outwardly from the opposite lower edges 168,170 of the hopper left and right bottom walls 160,162. An upper horizontal floor 188 in the trough is spaced below the cement hopper opening 172 and extends between the trough side walls 180,182. The floor 188 also extends outwardly beyond the lower ledges 168,170 of the hopper left and right bottom walls 160,162, but terminates at locations spaced inwardly from the left and right end walls 184,186 of the trough 178. The trough 178 further includes a lower floor 190 spaced below the upper floor 188 and interconnecting the side walls 180,182 and end walls 184,186 of the trough 178.

A cement conveyor 192 of the metering apparatus 40 includes a pair of left idler and right driven sprockets 194,196. The sprockets are disposed midway between the trough side walls 180,182 adjacent opposite ends of the upper floor 188 on left and right shafts 198,200 rotatable mounted across the trough 178 through the opposite side walls 180,182. The conveyor 192 also includes a pair of left and right hollow baffle gates 202,204 disposed along the upper floor 188 of the trough 178 adjacent and between outwardly-directed extensions 206,208 on the opposite lower edges 168,170 of the hopper left and right bottom walls 160,162 and respective entrance and exit portions 210,212 (FIG. 5) of the trough upper floor 188. Each baffle gate 202,204 is connected to the floor 188 and forms a rectangular-shaped hollow tunnel therewith, being formed by a pair of sides 214, 216 (FIGS. 6 and 7) extending upwardly from opposite sides of the floor 188 and a top 218 bridging the sides 214,216 and spaced above the floor 188. Front and rear ends of each baffle gate 202,204 are open.

Finally, the cement conveyor 192 includes a continuous, link-type drive chain 220 which extends about the sprockets 194,196 for movement along an endless path. An upper, cement conveying run 222 of the chain 220 is disposed for movement in a left to right direction in FIG. 5, along and above the upper trough floor 188 and through the baffle gates 202,204 disposed adjacent opposite ends thereof, while a lower, return run 224 of the chain 220 is disposed between the upper and lower trough floors 188,190 for movement in a right to left direction. The chain 220 has rectangular-shaped drag paddles 226 attached to opposite sides thereof and extending laterally therefrom. The chain 220 and paddles 226 together have an overall width and height dimensioned to effectively fill the rectangular cross-section of the interior of each hollow baffle gate 202,204 as the chain 220 is moved through each gate. Consecutive drag paddles 226 are alternately disposed along opposite sides of the chain 220, as can be readily seen in FIG. 2. The length of each baffle gate 202,204 equals the distance between at least two consecutive paddles 226 such that cement, being in flowable condition, is trapped between the paddles with the baffle gates 202,204 as the chain 220 and paddles 226 move through the gates. A chain tightening shaft 228 with an eccentric portion 230 is rotatably mounted between and extends through the trough side walls 180,182 near the left idler sprocket 194. The shaft 228 may be rotated exteriorly of the trough 178 for adjusting the tension or tautness of the chain 220.

Figures 5, 6, 7, 8:
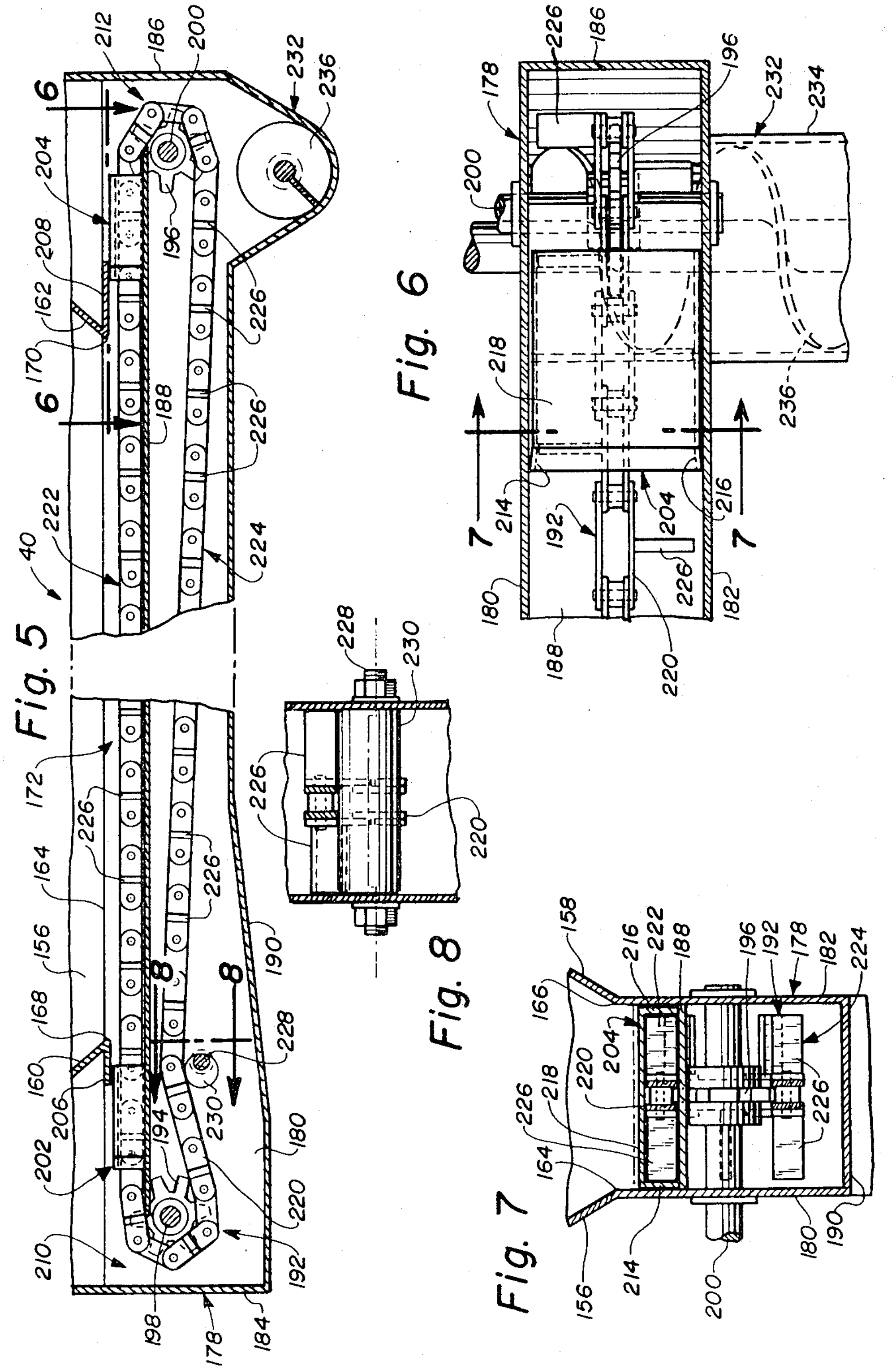
FIG. 5 is an enlarged fragmentary rear elevational view, partly in section, of the improved cement metering apparatus of the concrete production system as seen along line 5—5 of FIG. 1.
FIG. 6 is an enlarged fragmentary top plan view, partly in section, of a baffle gate of the cement metering apparatus as seen along line 6—6 of FIG. 5.
FIG. 7 is a fragmentary sectional view taken along line 7—7 of FIG. 6, showing the close fitting relationship of the chain and paddles of the metering conveyor with the interior of the baffle gate.
FIG. 8 is an enlarged fragmentary sectional view taken along line 8—8 of FIG. 5, showing the chain tightener mechanism associated with the conveyor of the cement metering apparatus.

Rotation of right driven sprocket 196 causes movement of the upper run 222 of the chain 220, from left to right in FIG. 5, that is in a direction away from the entrance portion 210 toward the exit portion 212 of the upper floor 188 of the trough 178. The chain 220 and drag paddles 226 of the upper cement conveying run 222 slide along the upper floor 188 in engagement therewith, dragging cement discharged into the trough 178 through the elongated bottom opening 172 of the cement hopper 36 toward the exit portion 212 of the trough floor 188. The baffle gates 202,204 disposed at the entrance and exit portions 210,212 of the upper floor 188 coact with the conveyor chain 220 and paddles 226 as they pass therethrough to trap cement so as to achieve two different effects. On the one hand, cement is trapped at the left gate 202 near the floor entrance portion 210 so as to prevent cement from flowing inadvertently past the floor 188 to the left when either the conveyor 192 is moving or standing still. On the other hand, cement is trapped also at the right gate 204 near the floor exit portion 212 so as to prevent cement from flowing inadvertently past the floor 188 to the right when the conveyor 192 is standing still. When the conveyor 192 is moving, the coaction of the right gate 204 and conveyor 192 permits conveying or metering of cement at only a known rate and quantity past the exit portion 212 of the trough upper floor 188.

For transferring cement from the discharge end of the cement metering apparatus 40 to the mixing auger 42, a transfer conveyor 232 extends fore-and-aft between the right end of the trough 178 and the auger 42. The conveyor 232 includes a tube 234 with an auger 236 rotatably mounted therein. Cement discharging at the floor exit portion 212 is fed by gravity into the forward end of the tansfer conveyor and discharged from its rear end into the mixing auger 42.

IMPROVED MOTOR MOUNTING ARRANGEMENT ON MIXING AUGER

Sand, stone and cement discharged into the mixing auger 42 is mixed into concrete as water is added to the mixture in the auger 42. As seen in FIGS. 1–3, the auger 42 includes elongated mixing trough 50 having an infeed tapered hopper 240 mounted on an inboard end 242 of the trough 50. As seen in detail in FIGS. 12–14, the trough 50 is formed by a pair of U-shaped arcuate angled brackets 244, one disposed at the inboard end 242 and the other (not shown) at the outboard end 48 of the trough 50. A pair of elongated, angled rails 250,252 extend between and are connected with the respective corresponding upper ends of the U-shaped arcuate brackets 244. A rubber sheet bent into a U-shaped tubular member 254 is disposed between the elongated rails and connected by bolts 256 to the opposite end arcuate brackets 244. As seen in FIG. 14, one longitudinal upper edge portion 258 of the tubular member 254 extends further upwardly above its associated rail 252 than the opposite other longitudinal upper edge portion 260. An elongated metal cover 262, arcuate-shaped in cross-section, is attached along one longitudinal side to the tubular member edge portion 258 such that the extended edge portion 258 functions as a flexible hinge for the cover 262. The cover 262 can assume the closed position shown in solid line in FIG. 14, and can be locked in that position by a latch 264 operatively disposed on the rail 250 near the infeed hopper 240, as seen in FIG. 14.

The outboard end 48 of the mixing trough 50 provides an opening through which concrete being mixed in the trough can be discharged from the mixing auger 42. A mixing screw member 266 is disposed in the trough 50 for receiving the ingredients for making concrete at the inboard end 242 and causing mixing of the same into concrete while conveying them toward the outboard end 48. The screw member 266 includes a central tube 268 with a continuous flighting 270 spiralling between the ends of the tube 268 and disposed in the mixing trough 50. As mentioned earlier in the detailed description, the motor 46 powering or rotating the screw member 266 is mounted on the inboard end 242 of the trough 50 by an improved mounting arrangement 44 which constitutes the third improved feature incorporated by the concrete production system 10.

Mounting of the motor 46, which is preferably hydraulic, at the inboard trough end 242 provides improved weight distribution of the mixing auger 42 for swinging it between operating and storage positions and allows auger extensions to be added to its terminal discharge end 48.

The improved motor mounting arrangement 44, depicted in detail in FIGS. 12 and 13, includes a mounting frame 272 and a coupler shaft assembly 274 drivingly coupling the motor 46 to the screw member 266. The frame 272 is connected at one end to the inboard end 242 of the mixing trough 50, and at an opposite end, it mounts the motor 46 such that an output shaft 276 of the motor extends toward the trough inboard end 242. The coupler shaft assembly 274 is disposed between the motor 46 and trough inboard end 242 ánd rotatably interconnects the motor output shaft 276 to the screw member 266 so as to transmit rotary driving motion thereto.

The mounting frame 272 includes a rectangular housing 278 formed by spaced inner and outer plates 280,282, and spaced transverse plates 284,286 interconnecting and rigidly attached to the inner and outer plates 280,282. A pair of legs 288,290 of the frame 272 rigidly attaches the inner plate 280 of the housing 278 on a metal end plate 292 on the inboard trough end 242. Rigidly mounted between the spaced inner and outer plates 280,282 is a cylindrical hollow central sleeve 294.

The motor 46 is attached to the outer plate 282 with its output shaft 276 extending through a central opening 296 therein, through the central sleeve 294, beyond the inner plate 280 and interfitted with a central shaft 298 of the coupler shaft assembly 274. A hub 299 of the assembly 274 is mounted on the exterior side of the metal end plate 292 on the trough inboard end 242 and has a central bore 300 through which the coupler assembly central shaft 298 extends. The shaft 298 at its inner end extends through a central opening 302 in the metal end plate 292 and is interfitted with the screw member 266. A wear plate 304 having a central opening 306 is mounted on the interior side of the metal end plate 292 by bolts 308 with the shaft 298 also extending through the opening 306. The central shaft 298 at its outer end is interfitted with the motor output shaft 276 such that the shaft 298 is effectively coupled for transmitting the rotary motion of the motor output shaft 276 to the mixing screw member 266. A rubber seal 310 is disposed about the central shaft 298 adjacent the hub 299, and a pressure plate 312 is attached to the hub 299 so as to squeeze the seal therebetween for sealing the bore 300 of the bub 299.

Finally, for protecting the motor 46 from dripping water and materials, the coupler assembly 274 includes an annular element 314 interposed between the motor 46 and the trough inboard end 242 and operable to substantially shield the motor 46. The annular element 314 is in the form of a spinner plate 316 attached about the central shaft 298 for rotation therewith and disposed along the shaft at the end thereof adjacent the inner plate 280 of the mounting frame 272. A bushing 318 is disposed about the motor output shaft 276 and between the inner plate 280 of the frame 272 and the spinner plate 316 of the coupler assembly 274.

IMPROVED MOUNTING AND STORAGE ARRANGEMENT FOR MIXING AUGER

Concrete mixed in the auger 42 can be dispensed at any location within an arc of 270 degrees about the rear right corner of the chassis 12 of the production system 10 due to the improved mounting and storage arrangement 52 incorporated by the system 10. The arrangement 52, which constitutes the fourth improved feature, also provides a unique location for storing the auger 42 during transport of the system 10. Specifically, an elongated hollow cavity 320 is defined in the right, outboard side wall 60 of the tank 22. The cavity 320 opens outwardly from the side of the tank 22, is inclined upwardly from the rear toward the front of chassis 12 and is configured to conform to the shape of the mixing auger 42 so as to receive and store it within the width of the chassis 12. The upper end of the cavity 320 is also open at the top of tank 22.

The mixing auger 42 is supported, preferably at the right rear corner of the chassis 12, for pivotal swinging movement between its storage position in cavity 320 and a range of operating positions located within an arc of approximately 270 degrees extending from the storage position and about the right rear corner of the chassis by three basic arrangements: first an auger mounting assembly generally designated 322 in FIGS. 1-4; second, an auger raising and lowering mechanism generally designated 324 in FIGS. 1-3; and, third, an auger swinging mechanism, generally designated 326 in FIGS. 1-3.

The auger mounting assembly 322 mounts the mixing auger 42 at the inboard end 242 of its trough 50 for pivotol movement about generally horizontal and vertical, orthogonal axes. The assembly 322 includes a pair of concentrically-mounted, horizontally-disposed, inner and outer rings 328,330. The inner ring 328 is rigidly connected to the chassis 12 and centered below the discharge ends of the aggregates transfer conveyor 132 and cement transfer conveyor 232. The outer ring 330 is rotatably mounted in a swivel-type coupling to the inner ring 328 about a common, central vertical axis. While the inner ring 328 stays in a fixed position, the outer ring 330 can slidably move in rotational fashion in either clockwise or counterclockwise directions about it. The mixing auger 42 is mounted to the outer ring 330 at opposite, 180 degrees displaced, locations on the ring by pivot pins 332 inserted in upright tabs 334 (only one being seen in FIG. 1) attached on the upper end of the hopper 240 on the inboard end of the auger trough 50. The tabs 334 pivotally mount the auger 42 to the outer ring 330 about a common horizontal axis defined by the pivot pins 332. The sand, stone and cement discharging from their respective conveyors 132,232 fall by gravity into the auger hopper 240 through the rings 328,330.

The auger raising and lowering mechanism 324 and auger swinging mechanism 326 both connect the mixing auger 42 at the outboard end 48 of its trough 50 to the mobile chassis 12 via the upper portion 144 of the cement hopper 36. Mechanism 324 is operable to place the auger 42 at selected positions about the horizontal axis defined by pivot pins 332 between raised and lowered positions, while mechanism 326 is operable to place the auger 42 at selected positions about the vertical swivel axis defined by mounting rings 328,330 between side and rear transverse positions.

The auger raising and lowering mechanism 324 includes a hollow tube 336 mounted upright above the chassis 12 by a pair of upper and lower brackets 338,340 fixed to the upper rear right corner of the cement hopper 36, and an elongated swivel arm 342 rotatably mounted to the tube 336 for movement in horizontal clockwise and counterclockwise directions about a central vertical axis defined by the tube and extending radially and horizontally outwardly from the tube. The swivel arm 342 has a hollow pipe 344 attached along it. The mechanism 324 further includes a hydraulic actuator 346 fixedly anchored at its cylinder end to the lower mounting bracket 340 and extending therefrom along the rear side of the cement hopper 36. An idler pulley 348 is rotatably mounted to the piston rod end of the actuator, while another idler pulley 350 is rotatably mounted to the lower bracket 340 below and in alignment with the center of the hollow upright tube 336. Finally, mechanism 324 includes flexible means in the form of a cable 352 which is attached at one end to bracket arm 354 on the outboard end of the auger trough 50, extends along the swivel arm 342 through the hollow pipe 344 fixed thereon and therefrom down into the upper end of the hollow tube 338 and through the tube. From the lower end of the tube 338, the cable 352 extends downwardly about idler pulley 350 and laterally to the idler pulley 348 on the piston end of the actuator 346. After the cable 352 passes about idler pulley 348, it runs back to the upper mounting bracket 338 to which it is attached at its other end at 356. I can readily be seen that movement of the piston rod end of the hydraulic actuator 346 between extended and retracted positions along a generally linear path causes movement of the flexible cable 352 within the hollow pipe 344 along the swivel arm 342 toward and away from the upper end of the hollow tube 336 which causes corresponding pivotal movement of the mixing auger 42 about its horizontal mounting axis between raised and lowered positions. It should be understood that the actuator 346 can be selectively actuated to any desired position between full extension and retraction of its piston rod end such that the mixing auger 42 can be selectively disposed at a multitude of positions intermediate full raised and lowered positions.

The auger swinging mechanism 326 includes a sprocket gear 358 attached to the swivel arm 342 and rotatably mounting the arm on the hollow tube 336 about the generally vertical axis extending coaxial with the center of the tube. The mechanism 326 also includes an idler gear 360 mounted on a bracket 362 attached to the upper rear side of the cement hopper 36 and an endless flexible member in the form of a drive chain 364 extending around and between the sprocket and idler gears 358,360 and mounted thereto for driving movement along an endless path. A hydraulic actuator 366 is anchored at its cylinder end to the chassis 12 via a mounting bracket 368 attached also to the upper rear side of the cement hopper 36. The actuator 366 at its piston rod end is connected to the drive chain 364 and is movable along a generally linear path between extended and retracted positions for moving the drive chain 364 so as to rotate the driven sprocket gear 358 in corresponding counterclockwise and clockwise directions, as seen in FIG. 2. As driven sprocket gear 358 rotates counterclockwise, the swivel arm 342 rotates therewith about the vertical axis and pivotally swings the mixing auger 42 away from its side storage or transport position and toward its rear transverse position. As the driven sprocket gear 358 is rotated in reverse, clockwise direction, the swivel arm 342 rotates therewith and pivotally swings the mixing auger 42 back toward its storage position. The swivel arm 342 causes the auger 42 to swing in the manner described through its interconnection therewith by the flexible cable 352 of the auger raising and lowering mechanism 324. The actuator 366 can be selectively actuated to any desired intermediate position such that the auger 42 can be disposed at a multitude of intermediate positions between full side and rear positions.

The pivotal movement of the mixing auger 42 about its vertical mounting axis between extreme side and rear transverse positions can occur simultaneously, and without interferring, with the pivotal movement of the auger about its horizontal mounting axis between raised and lowered positions. This is the case since the flexible cable 352 of the auger raising and lowering mechanism 324 in being aligned for movement through the center of the hollow tube 336 and along the swivel arm 342 for producing the raising and lowering of the auger 42 can also twist about the center of the hollow tube 336 to accommodate pivotal movement of the arm 342 about the center of the hollow tube 336 which produces movement of the auger 42 between side and rear transverse positions.

POWER DRIVE TRAIN OF THE PRODUCTION SYSTEM

The power drive train, generally designated 368, for the aggregrates conveying apparatus 32 and the cement metering apparatus 40 is illustrated in FIG. 4. The drive train 368 includes a hydraulic motor 370 mounted at the rear portion of the chassis 12 behind the rear end wall 56 of the storage tank 22 and between the lower, conveying run 98 and upper, return run 100 of the aggregates drag conveyor 91. A first gear bod 372 is disposed on the chassis 12 to the right of the hydraulic motor 370, with a power output shaft 374 of the motor extending to and connected with the imput side of the gear box 372. A second gear box 376 provided on the chassis 12 is driven from the first gear box 372 via a universal drive shaft 378 extending therebetween. A drive shaft 380 for the aggregates drag conveyor chain 96 which has the rear driven sprocket 94 splined thereon is mounted parallel to and rearwardly of the power output shaft 374 of the hydraulic motor 370 by a pair of bearings 382 fixed on the chassis 12. A pair of drive sprockets 384,386 are respectively splined on the hydraulic motor output shaft 374. Sprockets 384,386 and the aggregates conveyor drive shaft 380 are in alignment with one another and interconnected by a drive chain 388 for transmitting rotary driving motion from the hydraulic motor 370 to the rear driven sprocket 94 for moving the drag conveyor chain 96 about its endless path.

The first gear box 372 has an output shaft 390 with a drive sprocket 392 splined thereon in alignment with a driven sprocket 394 mounted on the right shaft 200 of the cement metering apparatus 40. A chain 396 drivingly couples the drive and driven sprockets 392,394 together. The second gear box 376 furnishes drive power to the aggregates transfer conveyor 132 and cement transfer conveyor 232. The output shaft 398 of the second gear box 376 has a drive sprocket 400 thereon which is aligned with and interconnected by a chain 402 to a driven sprocket 404 on the front end of the auger 236 of the cement transfer conveyor 232. The output shaft 398 of the second gear box 376 also is interconnected via an universal joint drive assembly 406 with a drive sprocket 408 journaled on the frame 133 of the aggregates transfer conveyor 132. The drive sprocket 408 is aligned and drivingly interconnected by a chain 410 with a driven sprocket 412 on the right shaft 140 of the transfer conveyor 132. By such drive train, rotary drive motion of the output shaft 374 of the hydraulic motor 370 is transmitted synchronously via first and second gear boxes 372,376 and associated chains and sprockets and universal shafts to the aggregates drag conveyor 91 and transfer conveyor 132, and to the cement transfer conveyor 232. It will be recalled that the mixing auger 42 has its own hydraulic motor 46 mounted on its inboard end 242.

It is thought that the improved features of the concrete production system and many of their attendant advantages will be understood from the foregoing description and it will be apparent that various changes may be made in the form, construction and arrangement of the parts of the concrete production system described herein without departing from the spirit and scope of the invention or sacrificing all of its material advantages, the form hereinbefore described being merely a preferred or exemplary embodiment thereof.

I claim:

1. In a concrete production system having a longitudinal tank for storing aggregates and a longitudinal bottom trough for receiving said aggregates therefrom, said trough being open at its top in communication with said tank and having a discharge end, improved aggregates conveying apparatus which comprises:

(a) said tank being composed of a pair of side-by-side, longitudinal hoppers for respectively storing fine and coarse aggregates;

(b) said trough being disposed in common to both of said hoppers for receiving said respective aggregates therefrom, said trough having a generally horizontal bottom floor and a pair of laterally spaced generally upright sides which at their upper edges define said open top thereof and at their lower edges are interconnected by said bottom floor, said spaced sides and bottom floor of said trough defining a space generally rectangular in cross-section into which aggregates from said respective hoppers of said tank can flow only through said open tank of said trough;

(c) a continuous conveyor mounted for movement along said trough, said conveyor having a lower aggregate conveying run disposed in said space defined by said spaced sides and bottom floor of said trough and in slidable engagement within said trough, said conveyor having a width and height adapted to substantially match said sides and bottom floor of said trough and fill said trough such that its open top overlies said conveyor, said conveyor for dragging aggregates, received from said hoppers of said tank into said trough, onto its bottom floor and only through its open top overlying said conveyor, toward said trough discharge end without allowing any stationary build-up of aggregates within said trough and an upper return run disposed above said trough and said lower run of said conveyor; and (d) a longitudinal wall structure extending through said tank between said hoppers thereof and defining a chamber isolated from said aggregates stored in said respective hoppers of said tank which provides a passageway for said upper return run of said conveyor, said longitudinal wall structure including (i) a tubular wall portion spaced above said open top of said trough for allowing passage of aggregates from said hoppers of said tank into said trough open top, said tubular wall portion defining said chamber which provides said passageway for said upper return run of said conveyor, and (ii) a lower longitudinal generally vertical wall portion attached to and extending below said tubular wall portion and between said hoppers of said tank, said wall portion having a lower edge disposed generally at the level of said open top of said trough and aligned above said lower run of said conveyor so as to keep said lower conveyor run from rising up over aggregates received and being conveyed in said trough.

2. The concrete production system as recited in claim 1, wherein said conveyor includes a continuous link-type drive chain being disposed centrally through said trough and having drag bars attached to, and extending laterally from, opposite sides of said chain and adapted to scrape along said bottom floor of said trough, said laterally extending drag bars having a height and width adapted to substantially fill said trough on either side of said drive chain, said lower edge of said vertical wall portion being disposed above and generally aligned with said drive chain so as to keep said chain from rising up over aggregates received and being conveyed in said trough, said drive chain and said vertical wall portion also substantially segregating the fine and coarse aggregates from one another as they are being conveyed toward said discharge end of said trough.

3. The concrete production system as recited in claim 2, wherein said drag bars are slanted upwardly in a direction opposite to their direction of movement so that movement of said bars under aggregates in said trough forces said chain toward said trough bottom, preventing said chain from riding over said aggregates.

4. The concrete production system as recited in claim 2, wherein said conveyor includes a pair of sprockets rotatably mounted adjacent opposite ends of said trough and around which said chain is mounted for movement along an endless path.

5. The concrete production system as recited in claim 2, wherein said hoppers have respective bottom ends which slant downwardly and inwardly toward said trough from opposite sides thereof, said slanted hopper bottom ends being spaced below lateral longitudinal sides of said tubular wall portion so as to allow downward flow of said respective fine and coarse aggregates through the space between said respective hopper ends and tubular wall portion sides and into respective sides of said common bottom trough only through said open top thereof.

* * * * *